Nov. 28, 1944. F. L. McCULLOCH 2,363,798
CITRUS FRUIT JUICE EXPRESSING MACHINE
Filed Feb. 12, 1943 6 Sheets-Sheet 2

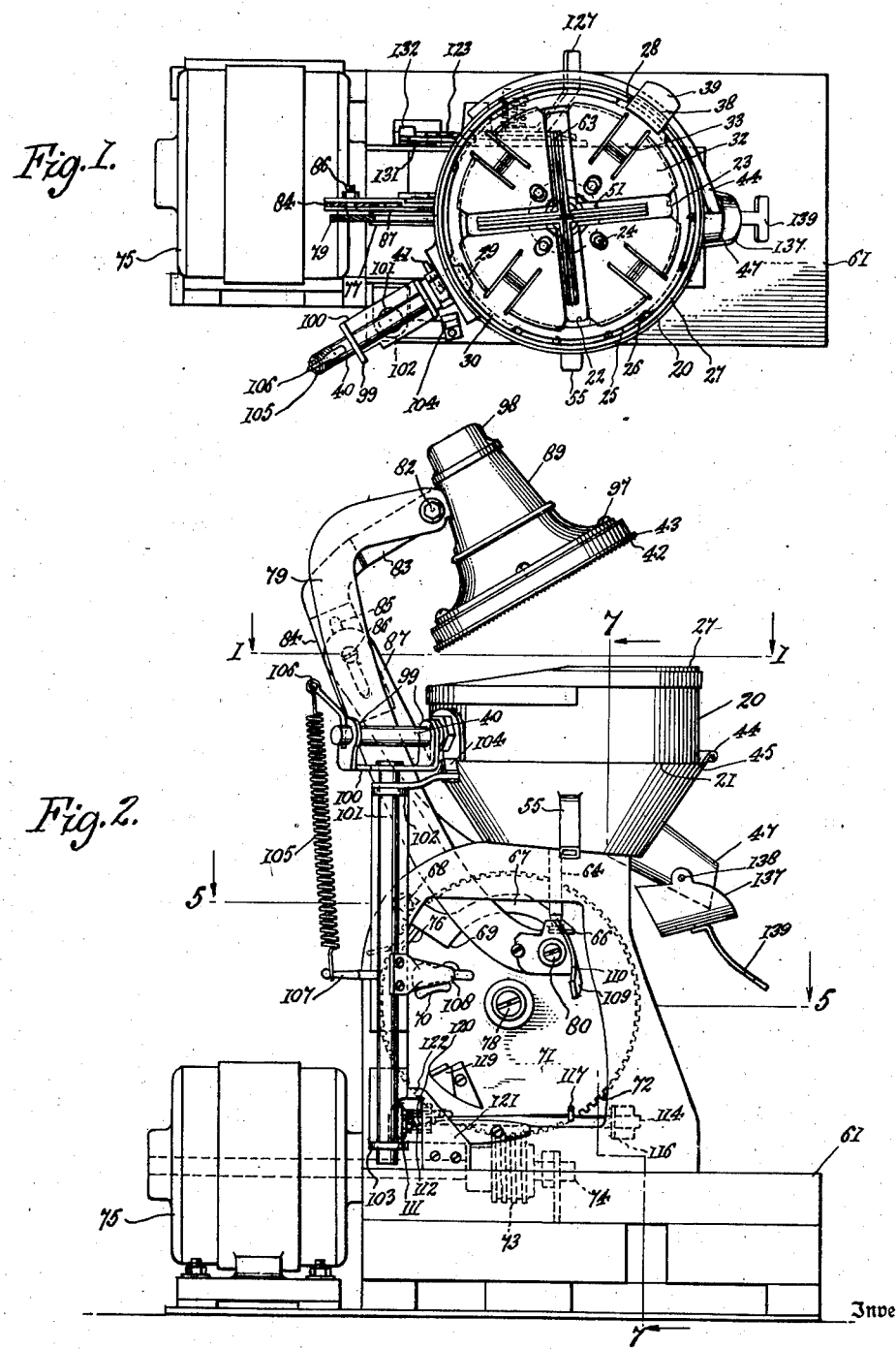

Inventor
Frederick L. McCulloch
By Wilkinson & Mawhinney
Attorneys

Nov. 28, 1944.　　　F. L. McCULLOCH　　　2,363,798
CITRUS FRUIT JUICE EXPRESSING MACHINE
Filed Feb. 12, 1943　　　6 Sheets-Sheet 3

Inventor
Frederick L. McCulloch
By Wilkinson & Mawhinney
Attorneys

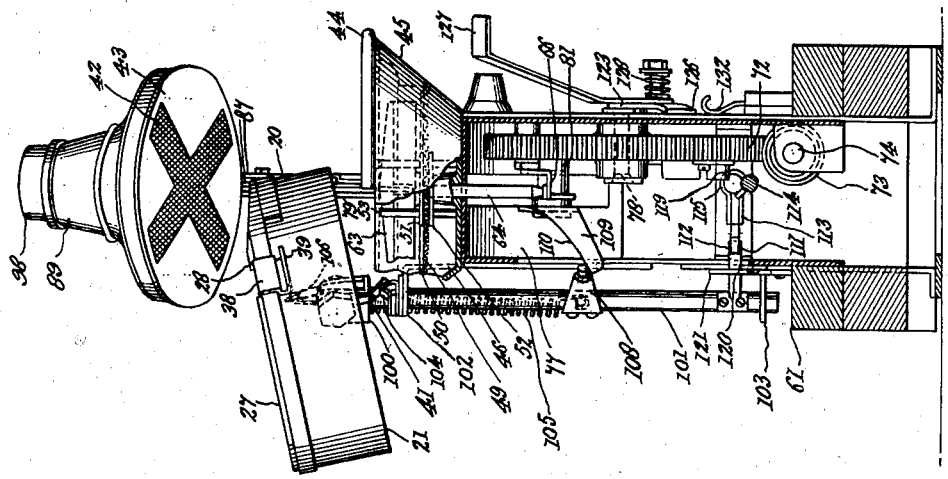

Nov. 28, 1944.  F. L. McCULLOCH  2,363,798
CITRUS FRUIT JUICE EXPRESSING MACHINE
Filed Feb. 12, 1943  6 Sheets-Sheet 5
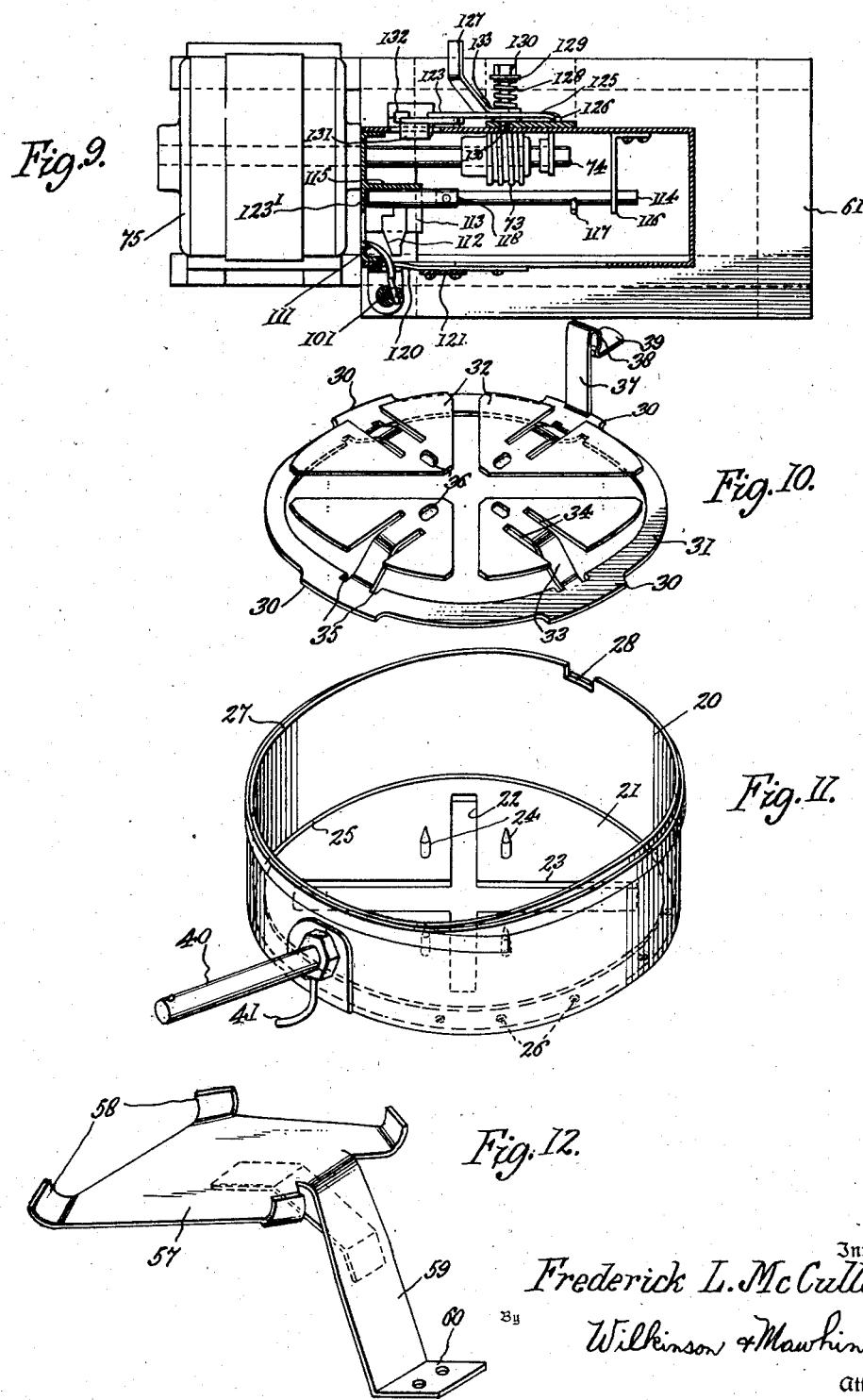
Inventor
Frederick L. McCulloch
By Wilkinson & Mawhinney
Attorneys Nov. 28, 1944.   F. L. McCULLOCH   2,363,798
CITRUS FRUIT JUICE EXPRESSING MACHINE
Filed Feb. 12, 1943   6 Sheets-Sheet 6
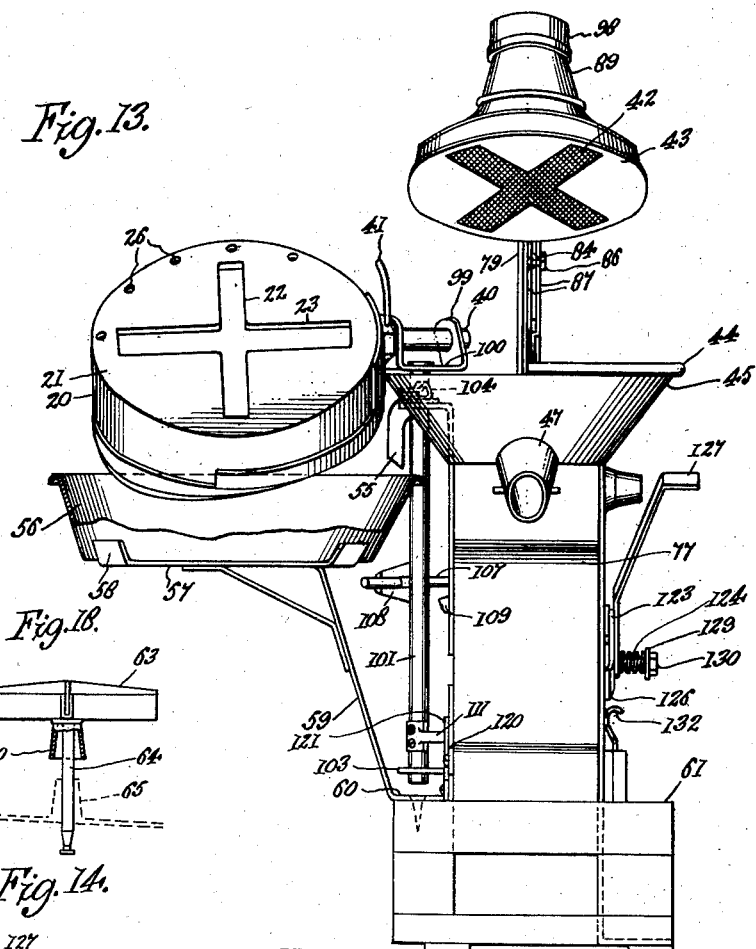
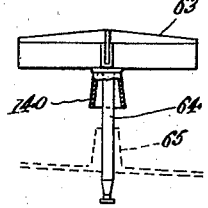
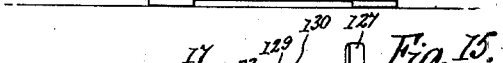
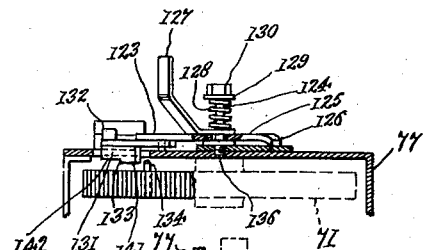
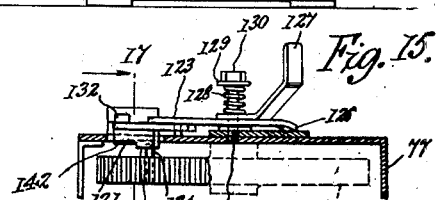
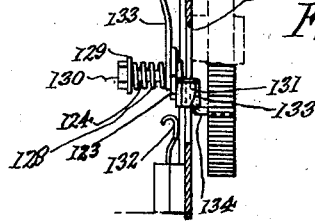
Inventor
Frederick L. McCulloch
By Wilkinson & Mawhinney
Attorneys Patented Nov. 28, 1944

2,363,798

UNITED STATES PATENT OFFICE 2,363,798

CITRUS FRUIT JUICE EXPRESSING MACHINE

Frederick L. McCulloch, Tampa, Fla.

Application February 12, 1943, Serial No. 475,677

11 Claims. (Cl. 100—41)

The present invention relates to improvements in citrus fruit juice expressing machines, and has for an object to provide an automatic machine in which a series of related functions are performed in sequence by which the fruit received by hand into the machine is incised for free juice flow, squeezed to express the juice, the juice and rind oils prevented from commingling and led off individually to separate collection destinations, the hull or carcass of the de-juiced fruit dumped or automatically thrown from the machine, and the machine automatically stopped in a position of origin where the expressing device is clear of the fruit receiver to the end that a subsequent piece of fruit may be manually introduced into the machine expeditiously, without delay and confusion, and the machine again set in motion on a subsequent phase of operations.

Another object of the invention is to group all of the above agencies for conjoint and timed operation in a definite sequence to produce the orderly results in the steps named in the immediately preceding paragraph, and to provide for simplified control of the operation of the machine, and not only to cause stoppage of the machine on the completion of each cycle of operations, but also to brake the machine to prevent overrunning the origin position heretofore referred to which would introduce difficulties in the way of placing the fruit in the machine for subsequent squeezing and juicing operations.

A further object of the invention resides in providing an improved knife or incising device and its operating members, in coordination and combination with an improved expressing plunger or pressure plate, in which the development of pressure on the fruit is had through the medium of coil springs in conjunction with a lever movement for compressing such springs.

A still further object of the invention is to provide an improved receiver for the fruit in which provision is made for collecting the juice separately from the rind oils and conveying the same to separate containers, and in which the fruit receiver and preferably also the expressing plunger have means for locating the fruit in a central position best adapted for squeezing with reference to the slotted juice outlet bottom of the receiver; and in which, through a modification, provision is made for disengaging the de-juiced carcass of the fruit from centering impaling pins in the receiver just prior to the dumping motion of the receiver, which facilitates the ejection of the fruit carcass from the receiver and from the machine.

A still further object of the invention is to provide for a compound motion for the fruit receiver on its dumping or ejection motion whereby the receiver is moved clear of the expressing plunger, is given an initial dumping motion and is finally rotated rapidly through a final phase of its dumping motion to act upon the de-juiced fruit carcass in a manner to throw the same precipitately from the machine and if desired into a container positioned to receive the same.

A still further object of the invention is to provide an improved juice expressing machine wherein coordinate cam couples cooperate from a unified control to cause actuation in sequence of the various functions hereinbefore enumerated, and the subsequent return of the parts to an initial position in readiness for subsequent actuation in a cyclic performance of which the only manual operation consists in placing the fruit in the receiver and closing a starter motor switch.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a horizontal section, taken on the line 1—1 in Figure 2, of an improved citrus fruit juice expressing machine constructed in accordance with the present invention.

Figure 2 is a side elevation of the same with the parts shown in an origin position in readiness to receive the fruit.

Figure 7 is a transverse vertical section taken on the line 7—7 in Figure 2.

Figure 8 is a similar view but showing the fruit receiver in a subsequent position of its dumping movement.

Figure 8a shows a detail of the inclined wall 120 in relation to the rotating arm 111;

Figure 9 is a horizontal section taken on the line 9—9 in Figure 4.

Figure 10 is a perspective view of a removable false bottom unit for the fruit receiver.

Figure 11 is a perspective view of a form of receiver employed.

Figure 12 is a perspective view of a holder for a fruit carcass catching container.

Figure 13 is a front elevation of the machine with the fruit receiver shown in the dumping position.

Figure 14 is a fragmentary horizontal section through a portion of the framework of the machine showing the automatic stop and brake motion, and with the switch in a closed position.

Figure 15 is a similar view with the switch open.

Figure 16 is a similar view showing a still further phase in the movement in which the braking action occurs.

Figure 17 is a vertical section taken on the line 17—17 in Figure 15, and

Figure 18 is a fragmentary elevational view showing a hood or deflector for the knife shaft bearing.

Fruit receiver

Figure 3:
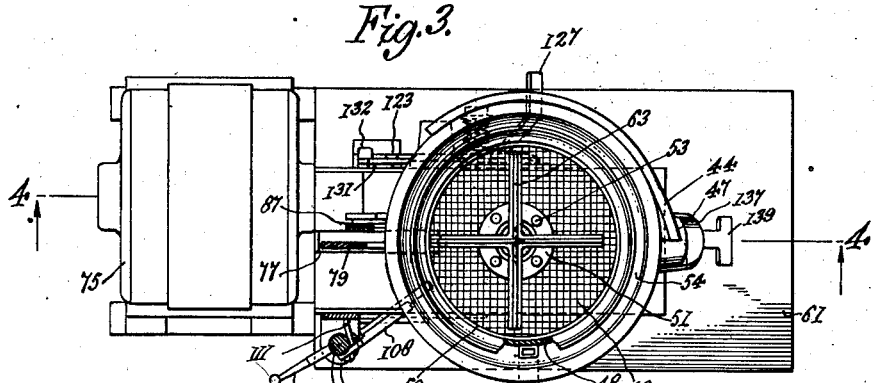
Figure 3 is a horizontal section taken on the line 3—3 in Figure 4.

Referring more particularly to the drawings, 20 designates the upstanding cylindrical wall of a form of fruit receiver, open at its top, into which the fruit may be thrown or introduced and closed at a bottom 21, as more particularly seen in Figure 11. In this real or permanent bottom 21 are made through slots 22 and 23 which preferably intersect substantially centrally to form a cross or cruciform slot arrangement up through which the knives are projected to cut through the rind or skin of the fruit in accordance with a cruciform design. An upstanding rim may be provided around the knife slots 22, 23 to keep oil out of the juice, as disclosed in my prior Patent 2,174,909. Upstanding from the bottom 21 are pointed impaling pins 24 positioned to engage the fruit and center it with respect to the slots 22 and 23 and to maintain the fruit in the same position after slitting to facilitate the movement of the juice from the fruit when the expressing plunger is moved down upon the same. In other words the pins 24 serve to preserve the alinement of the incisions in the fruit with the slots 22 and 23. Such slots 22 and 23 function to admit the knives to move upwardly to the fruit and to allow the juice to flow downwardly and out of the fruit receiver or cup.

Around the outer margin of the receiver bottom 21 is an annular oil channel depressed below the plane of the bottom. This channel 25 is adapted to receive rind oils which may be expressed from the skin of the fruit during the juicing operation. Such oils are carried off from the channel 25 through outlet apertures 26. Such apertures 26 are at one side only of the fruit receiver or cup, as indicated in Figure 11, this being the low side of the cup referred to the tilting or dumping movement of the cup (Figure 8). If these outlet apertures 26 were at any other point throughout the circumference of the channel 25 they would spray the oil into the juice basin, as hereinafter described, and cause an undesirable commingling of the oil and juices, which would materially decrease the commercial price that the juice product of the machine could command in the market.

The upper edge 27 of the side wall 20 of the fruit receiver or cup is cut down at its rear and the side opposite the outlet apertures 26 to give the receiver greater clearance with respect to the plunger or expressing head during the movement in which the receiver is raised off its base and slid sidewise, for which see Figure 8. A notch 28 is made in the upper edge of receiver wall 20 and an overhanging detent ledge 29 (Figure 1) projects from the lower part of wall 20 at a point which is shown to be diametrically opposite the notch 28. Fitting removably beneath the overhanging ledge 29 is one of a series of circumferentially spaced lugs 30 on a removable false bottom member, shown in Figure 10. The lugs 30 project outwardly from a ring or annulus 31, the outer diameter of which, except for the lugs 30, is less than the interior diameter of the wall 20 to provide spaces between the lugs 30 for the rind oil to find its way downwardly into the annular channel 25. This false bottom may or may not be used but it is preferably formed of sheet metal as an auxiliary to the fruit receiver and, besides the ring 31, is composed of quadrants or segments 32 which are separated from one another and from the ring 31 and which are supported at an elevation above the ring 31 by tongues 33 which may be stamped out of the sheet metal of which the ring 31 and segments 32 all form integral parts. The tongues 33, except at their inner ends, are separated from the segments 32 by lines of incision 34. Such tongues 33 have inner portions which lie in the same plane with the quadrants 32 and radially outer portions which are bent down into the plane of the ring 31 with which they merge. Notches 35 are cut in the inner edge of the ring 31 at opposite sides of the tongues 33 to facilitate the bending of the tongues of the spring steel metal. Perforations 36 in the segments 32 are positioned over the impaling pins 24 and allow the segments 32 to ride up and down, in accordance with the weight of the fruit and the pressure of the plunger or presser head, without interference from the pins 24. Should the fruit become impaled on the pins 24, when the pressure of the plunger is relieved from above, the inherent resiliency in the tongues 33 will cause the segments 32 to ride up to their initial upper position and thus lift the hulls or carcasses of the squeezed fruit from off such impaling pins.

An upstanding leg 37 on the ring 31 or one of its lugs 30 carries a spring clip 38 at its upper end and an outstanding finger piece 39. The spring clip 38 is adapted to engage the notch 28 in the receiver wall 20 in the manner shown in Figures 7 and 8, thus releasably holding the false bottom in the fruit receiver during such times as its presence is desired, and the finger piece 39 forming a convenient hand hold to pry the spring clip 38 from its frictional engagement and to lift the false bottom out of the receiver.

The receiver wall 20, as shown in Figure 11, has projecting radially therefrom at its rear side a shaft 40, which forms the mounting for the receiver, as hereinafter described. A trip finger 41 also projects down from the receiver or shaft 40 and contributes to the tripping and dump of the receiver as later explained.

The false bottom attachment may be used for juicing small fruit, as lemons, limes and tangerines. The segments elevate the fruit closer to the plunger or presser plate so that small fruit may be appropriately squeezed to express all of the juice therefrom without having to alter the throw of the plunger or presser plate which would entail considerable mechanical modification. In positioning the device, the finger piece 39 supports the false bottom so that it may be tilted slightly to enable the edge of a lug 30 to engage beneath the overhanging detent ledge 29; whereupon the clip 38 may be snapped down over the receiver wall 20. The spring clip 38 on the handle or leg 37 holds the attachment in the cup or receiver when the receiver is being given that violent tilting movement which results in the dumping of the hull of the fruit.

The false bottom attachment can be stamped from one piece of spring steel or formed from spring wire. With its use one to five small fruits can be juiced in one operation.

The segments 32 hold small fruit up to permit the plunger or press plate to contact it before the knife. If the knife were brought up before the plunger or press plate was lowered to prevent the fruit lifting on the upstroke of the knife, the latter would be ineffective to properly incise the fruit. Moreover the segments hold the fruit in position for subsequent plunger operation.

The face of the press plate is roughened, as shown at 42 in Figure 8, to prevent the fruit from moving after contact with the press plate 43.

*Juice and oil evacuation*

The fruit receiver or cup 20 is confined by a flange 44 (Figures 4, 7 and 8) which serves to center the receiver on a base 45 and to arrest its movement when the receiver returns to its accustomed position in the machine after shifting out from the base 45 and rotating to the dump position shown in Figures 8 and 13 whereby to discharge the hull or carcass of the squeezed fruit. The flange 44 serves to cause sure registration of the juice and oil outlets respectively of the cup with the similar parts of the base. As shown more particularly in Figure 4, the base 45 is preferably in the form of an inverted frustum of a cone and constitutes, in its lower portion, a collecting basin 46 for the fruit juice which descends through the cruciform slots 22 and 23 of the fruit receiver bottom 21. Such basin 46 inclines to a juice delivery spout 47 projecting to the front or other part of the machine.

The juice descends into the basin 46 through a vertical trunk or passage formed within a cylindrical wall 48 which may be permanently or otherwise mounted in the base 45. A screen or sieve 49 is mounted within the wall 48 and is connected at its outer edge to the ring 50 and at its inner portion to flat rings 51 and 52, these various rings being soldered, brazed or otherwise secured to the metallic mesh 49. The screen 49 is supported by pins 53, shown for illustration to be four in number and distributed about the axis of the cylindrical wall 48. These pins are sufficiently long to rest at their lower ends upon the bottom of the basin 46 and at their upper ends to extend up beneath the receiver bottom 21 and to support the bottom at each of the four corners provided by the slots 22 and 23 (Figure 11), which slotting deprives the bottom of support at its inner corner portions. The pins 53 serve to sustain the pressure of the plunger and its spring action while also serving to support the screen 49 in proper position within the vertical juice trunk 48. The pins 53, rings 50, 51 and 52 and the screen 49 constitute a unit which may be lifted out of the vertical juice trunk 48 for the purpose of cleaning the screen of pulp, seeds and other accumulated matter which may tend in time to clog the meshes thereof and interfere with the free flow of juice.

An annular oil trough is mounted in the base 45 outwardly beyond and concentric with the upper portion of the juice trunk 48, and this oil trough 54 is directly below the outlet apertures 26 in the oil channel 25 of the fruit receiver bottom 21. The annular oil trough 54 may incline to an oil delivery spout 55, which may be brought off at one side of the machine, for instance at that side over which the fruit receiver executes its tilting and dumping movement; to the end that a single container 56 (Figure 13) may be provided for catching both the expressed oil and the de-juiced squeezed hulls of the fruit.

In Figure 12 a form of holder for the container is shown comprising a supporting shelf 57 having upstanding corner lugs 58 and a depending leg 59, preferably inclined away from its connected edge with the supporting shelf 57 and having an outturned basal flange 60 to rest upon and be secured to a foundation part 61 of the machine bed.

In operation, oil expressed from the fruit rinds collects in annnular channel 25 of the fruit receiver 20 flows down by gravity to and through the outlet apertures 26 and into the base trough 45 which induces flow to the oil delivery spout 55, by which the oil is conveyed to the container 56 on the exterior of the machine or to any other desired destination.

The juice expressed by the plunger action through the incised lower portion of the fruit descends through slots 22, 23 in the bottom of the fruit receiver 20, passes through the trunk or juice passage 48 and falls upon the screen 49 where all pulp, seeds and other foreign matter is removed, permitting only the pure juice to descend into the collecting basin 46 from which such juice is delivered by the spout 47 to the exterior of the machine and to a receptacle 62 (Figure 4); such as a drinking glass which may be supported on the bed 61 of the machine.

*The knife and its action*

The fruit is incised by a vertically reciprocating knife or knives 63 shown to be of a cruciform construction (Figure 1) in order to pass up and down through the slots 22, 23 in the base 21 of the fruit receiver 20, the knife blades preferably having inclined upper cutting edges in order to give a shearing cut through the skin or rind of the fruit, and to facilitate the cutting action.

Figure 4:
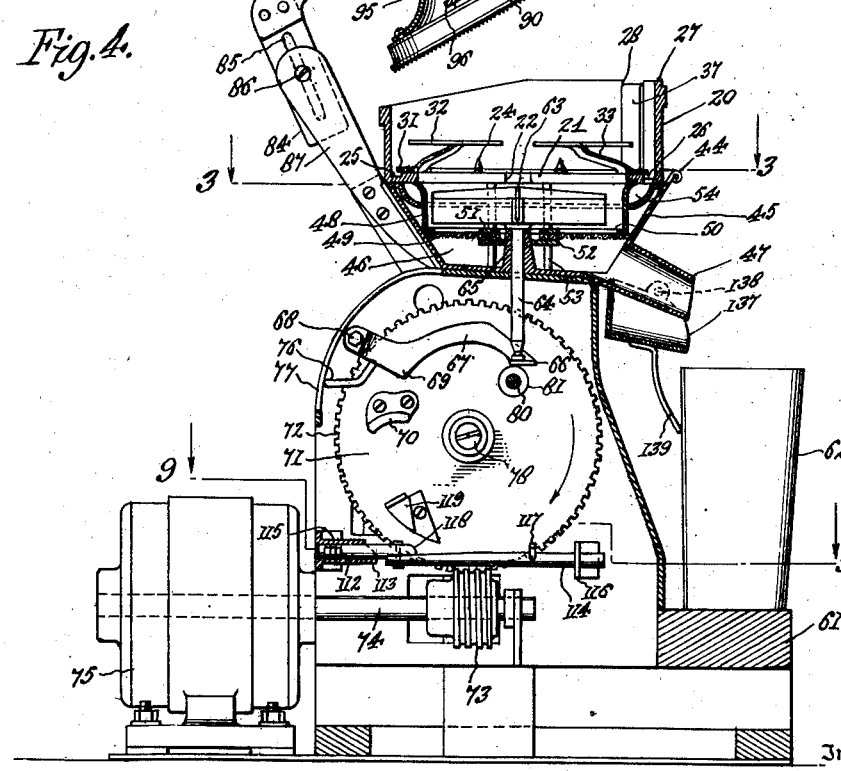
Figure 4 is a longitudinal vertical section taken on the line 4—4 in Figure 3.

The knife structure is carried upon a shaft 64 mounted to reciprocate in the boss or bearing 65 upstanding within the juice collection basin 46 (Figure 4). The cross sections of the shaft 64 and the opening of the bearing 65 are preferably rectangular or polygonal to avoid rotation of the cruciform knife structure lest the radiating knife blades casually or accidentally rotate out of registry with the bottom slots 22, 23 in the fruit receiver. The bearing 65 and shaft 64 project up through a central opening in the screen 49. As shown in Figure 18 a hood or deflector 140 may be carried just under the knife on the shaft 64 to cover bearing 65 to prevent juice running through bearing 65 injuring the working parts of the machine.

The lower end of the shaft 64 rests freely upon a shelf 66 of a tappet lever 67 fulcrumed at 68 upon a portion of the machine framework or other suitable fixed support. The lever is preferably curved, as shown in Figure 4, and is formed with a cam lobe or nose 69 to cooperate with an actuating cam 70 mounted upon a rotary disc 71 or other convenient driving element. One method of driving the disc 71 is by producing worm teeth 72 in its periphery to mate with a worm 73 on the armature shaft 74 of an electric motor 75.

In the lowered position of tappet lever 67, shown in Figure 4, the lever is supported by a finger or tail-piece 76 which in this position engages at its free left end with a part 77 of the framework of the machine.

The disc 71 is shown rotating around a center 78 appropriately journaled in the framework.

In operation, the cam 70 rotates clockwise, as indicated by the arrow in Figure 4, and its curved upper edge, once during each revolution of the disc 71, contacts and wipes across the lobe 69 of the tappet lever 67. During the short interval that this contact and wiping action occurs the tappet lever 67, shaft 64 and knife structure are all elevated to drive the knives on their incising operation. The cam 70 rotates through a relatively small angular distance to accomplish this purpose, after which it disengages the nose or lobe 69 and presents itself to the incurved portion of the tappet lever 67; thus enabling the tappet lever to fall by gravity back to the position, illustrated in Figure 4, where the tail-piece 76 engages the frame 77. The knife and its shaft 64 will also gravitationally seek the low position shown in Figure 4; it being understood, that in this low position, the knife 63 is contained within the confines of the juice trunk 48 and wholly below the bottom of the fruit receiver 20, so as not to interfere with the motion of the latter in executing its dumping action, as hereinafter more fully described.

The plunger and its operation

Figure 5:
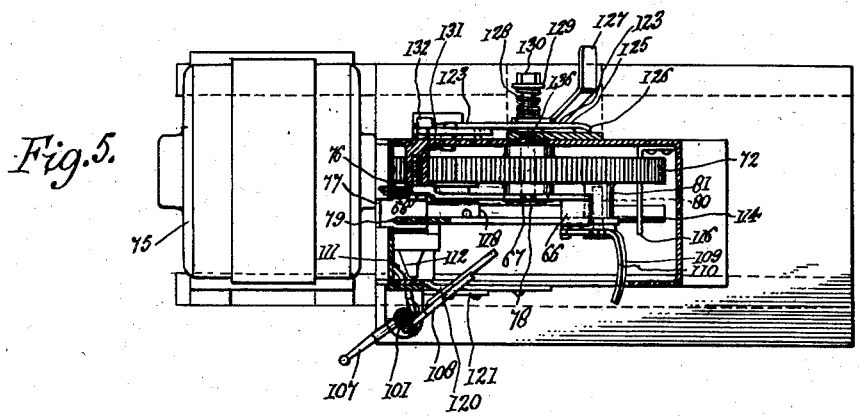
Figure 5 is a horizontal section taken on the line 5—5 in Figure 2.
Figure 6:
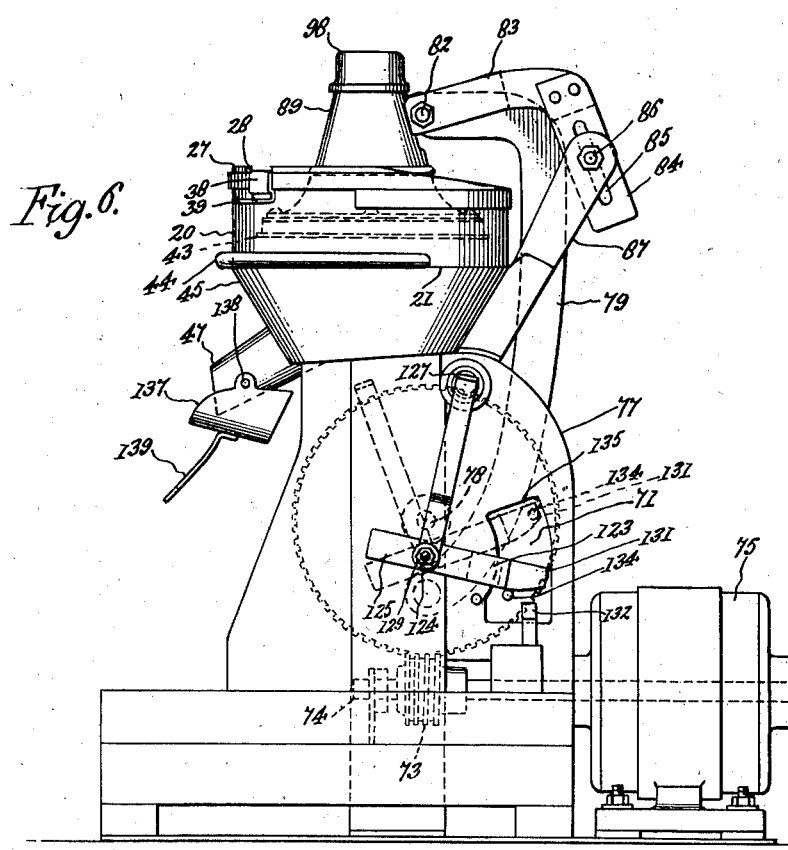
Figure 6 is a side elevation of the machine, shown from the side opposite Figure 2, and with the expressing plunger shown at substantially the bottom of its expressing stroke.

The plunger head moves between the positions shown in Figures 4 and 6, and is driven by means of a pitman 79 having a lower curved portion pivoted to rotating disc 71 and actuated thereby. A wrist pin 80 serves to secure the lower end of pitman 79 to a boss 81 (Figure 5) on the disc 71. The upper end of pitman 79 is angled and pivoted at 82 to the horizontal arm 83 of a bell crank, the vertical arm 84 of which is formed with an elongated slot 85 to receive the pin 86 on the bifurcated rigid bracket 87 secured to the frame of the machine.

The horizontal arm 83 of the bell crank projects through a slot 88 in an outer enclosing shell 89 and extends between a pair of bars 90 which are fixed at their lower ends to the press plate 43. The bars 90 are slotted as indicated at 91 to slidingly receive a pin 92 which passes through the bell crank arm 83. The arm 83 bears against a cap plate 93 forming an abutment for the upper ends of coil spring 94 and 95 wound about the bars 90 and having their lower ends engaging an abutment plate 96 affixed to the press plate 43. The shell 89 is removably secured to the press plate 43 by any suitable fastenings 97 and is closed at its upper end by a removable cap 98.

In operation, the plunger head is supported conjointly by the pitman 79 and the bell crank lever and both these agencies contribute to subject the plunger head to a composite motion, which is arcuate at the outer portion of its stroke and vertical at the lower portion of its stroke, as indicated in Figure 6. The motion is derived from the rotation of the disc 71, which imparts movement to the pitman 79, causing rocking of the bell crank lever and the composite motion of the plunger head. When the plunger on its down stroke enters the wall 20 of the fruit receiver it moves straight down on the fruit. The timing and arrangement is such that the plunger head moves down into a light but substantial contact with the fruit. At this instant, the cam 70 is timed to engage the lobe 69 of the tappet lever 67 and elevates the knife structure to incise the fruit while it is held firmly against upward motion by the plunger head. Thereupon the knife rapidly falls as hereinafter described, and the plunger continues to descend on its squeezing action in a substantially rectilinear vertical path. After the wrist pin 80 has passed bottom dead center, the pitman and plunger head will be raised through vertical rectilinear and finally arcuate motion to withdraw the plunger head from the fruit receiver 20.

During the pressing movement of the press plate 43 upon the fruit, should the resistance of the fruit exceed the combined loads of the springs 94 and 95, the pin 92 will move downwardly in the slots 91, thus compressing the coil springs and permitting of a yieldability in the presser plate 43 that will prevent breakage and at the same time add the compressive force of the coil springs to the mechanical pressing action developed by the pitman 79 upon the press plate 43.

The dumping motion of the fruit receiver

The shaft 40 carrying the fruit receiver 20 is journaled in upstanding bearings 99 on a yoke piece 100 which is affixed to the upper end of a vertical shaft 101. The latter shaft 101 is mounted in bearings 102 and 103 for both rotary movement and axial sliding movement in a vertical direction.

The bearing 102 carries a trip abutment 104 in the path of trip finger 41. A coil spring 105 is connected between arms 106 and 107 affixed respectively to the horizontal shaft 40 and to the vertical shaft 101.

Rotation of the shaft 101 is accomplished by a cam couple 108, 109; of which the cam arm 108 is affixed to the shaft 101 and projects in the path of the rotating cam arm 109 which is carried about with the disc 71, being affixed to the wrist pin 80 in the instance illustrated in the drawings. The cam arm 109 has a curved upper cam edge 110 designed to wipe beneath the arm 108 to turn the same outwardly (compare Figures 7 and 8).

A return cam couple 111, 112 consists of the curved arm 111 and the reciprocating arm 112 mounted to slide in a guide 113 and carried back and forth by a reciprocating rod 114 mounted in bearings 115 and 116; the latter bearing 116 (Figure 4) cooperating with a stop pin 117 on the rod 114 to restrict the sliding movement of the rod and its cam member 112 in a right hand direction. A shoulder 118 of the rod is disposed in the path of the cam 119 carried by the disc 71. The shoulder 118 and cam 119 constitute a cooperating cam couple, of which the shoulder 118 is the follower and the cam 119 the actuating element. The cam arm 111 is adapted to slide up an inclined surface 120 on the machine to act in raising the shaft 101, although this raising movement may be initially accomplished by the first phase of the wiping movement of cam arm 109 beneath cam arm 108. A keeper plate 121 (Figure 2) may be affixed to the frame of the machine to present an overlying stop limit lug 122 to the upper edge of the cam arm 111 to restrict the upper movement of the shaft 101; the inclined surface 120 tending to support the cam arm 111, the shaft 101 and the parts supported thereby when the cam arm 109 leaves its companion cam arm 108 during the course of the rotation of the disc 71.

In operation, cam arm 109 contacts cam arm 108 to cause initially a lifting of the shaft 101, its supporting yoke 100, the horizontal shaft 40 and the connected fruit receiver 20. This lifts the fruit receiver 20 slightly from the base, so as to eliminate friction in swinging the receiver 20 out clear of the base and the plunger head to enable the fruit receiver 20 to be rocked in a manner indicated in Figures 8 and 13, with consequent dumping of the hull of the squeezed fruit. As the disc 71 continues to rotate, carrying the arm 109 around, the curved surface 110 wipes further beneath the arm 108, the two contacting surfaces being so constructed and arranged that the arm 108 will be rotated outwardly, from the position shown in Figure 7 to that shown in Figure 8. In so rotating the shaft 101, the yoke 100 will be commensurately rotated, causing the fruit receiver 20 to be displaced from its accustomed position on the base and beneath the plunger head. This is a motion of translation which is followed by a rocking motion of the fruit receiver 20 on the horizontal shaft 40. The rocking movement is initiated by the trip finger 41 encountering the abutment 104 (compare Figures 7 and 8). This initial tripping is necessary to bring the extended coil spring 105 into play, it being understood that this distended spring 105 is in a dead center position, as shown in Figure 2, when the fruit receiver 20 is in its accustomed place in the machine. So soon, however, that the fruit receiver 20 is tilted to a slight extent by the tripping arrangement, the arm 106 is swung over to an angular position off dead center enabling the full contractile force of the coil spring 105 to be developed in further rotating the shaft 40 and its connected fruit receiver 20. The coil spring 105 will rather suddenly, rapidly and violently rotate the fruit receiver 20 to position approximately as indicated in Figure 13 to dump the fruit into any suitable receptacle placed for the purpose.

At this stage, the cam 119 on disc 71 arrives at the lower portion of its rotary travel and contacts shoulder 118 on the rod 114. The rod, and with it the cam 112, is pushed over to the position shown in Figure 4, pushing before it the arm 111 and thus rotating the shaft 101 back to its normal position. During this return movement the lower edge of the cam arm 111 will ride down the inclined surface 120 and permit the shaft 101 to descend axially. As the shaft returns the bottom of the fruit receiver 20 engages the edge of the base 45 to upright the fruit receiver to the position shown in Figure 8, and as the return rotary motion of the shaft 101 proceeds, to the accustomed position of the fruit receiver 20 on the base and beneath the plunger head. During this return movement the arm 106 is rotated with the shaft 40 up to its dead center position with respect to its companion arm 107, stretching the spring 105 into a potential position, which, however, cannot become active or kinetic because of its dead center position with respect to the axis of the shaft 40, which latter it tends to rotate immediately the arm 106 is swung away from its dead center position. A stop 123' (Figure 9) limits the movement of the rod 114 in the left or restoring direction. In this same Figure 9 can be seen the curvature on the effective surface of the arm 111 and the inclined wiping surface of the cam arm 112.

In the dumping movement, when cam arm 109 pushes cam arm 108 outwardly, the cam arm 111 is similarly moved through the rotation of the shaft 101. Viewing Figure 9, the cam arm 111 is moved to the right, pushing cam arm 112 to the right until pin 117 encounters bearing 116, at which position rod 114 is arrested with shoulder 118 located to be engaged by cam 119 in its next circular movement.

Figure 4 shows cam 119 as having shifted rod 114 on its return movement to the left and passed on, clearing the shoulder 118 in the rotary movement of the cam 119.

Figure 8 shows how the cam arm 108 is made cylindrical in cross section at its free end to more easily slide off the free end of its driver cam 109 to permit the cam 109 to continue its circular movement without interference from the follower cam arm 108.

*The automatic stop and brake motion*

Referring more particularly to Figures 6, and 14 to 17, inclusive, 123 represents a switch arm mounted to rotate about a pivot 124 projecting from the framework 77 of the machine. Such switch arm 123 carries a tail-piece 125 projecting diametrically to the other side of pivot 124. Such tail-piece 125 has at its free end an inturned toe 126 adapted to take against the frame 77 or a wear plate affixed thereto. The toe will partake of the same arcuate movement about the pivot 124 as a center as is executed by the switch arm 123. These parts are given such motion by an operating hand lever 127 connected at substantially right angles to the combined switch arm and tail-piece 123, 125. The pivot bolt 124 is threadedly connected, as at 136, to the frame of the machine, or otherwise connected thereto so as to stand out from the machine and from the switch arm 123, so that the bolt head 130 is spaced away from the switch arm 123 and accommodates a coil spring 128 wound in the helix about the projecting portion of the pivot bolt 124, said spring 128 abutting at one end against switch arm 123 and at its outer end against the bolt head 130 or a washer 129 interposed between the spring and bolt head.

A movable contact block 131 is carried by the switch arm 123 and moves in an arc into and out of engagement with a fixed contact member 132. The movable contact block 131 (Figure 17) has on its inner face a straight wall 141 to be engaged by a projection 134 on the rotary disc 71, and a curved wall 142 for the pin 134 to ride over; the curved wall 142 being stepped down or outwardly from the straight wall by a shoulder or step 133. This projection 134 is on the side of the disc opposite to the side on which the driver cams, heretofore described, are mounted.

In Figure 6 the machine frame 77 is shown as having an arcuate slot 135 in which the movable contact block 131 operates with accessibility to the rotating projection 134. The upper end of slot serves as a stop wall 135 to limit the upward movement of the movable contact block 131 and the switch arm 123. The axis 78 of rotation of projection 134 is offset from the center of rotation of switch arm 123 so that when pin 134 first comes under movable contact block 131 (Fig. 6) it encounters the straight wall 141 which enables pin to lift block 131 out of fixed contact 132, but when block 131 has reached stop 135 pin 134 has moved out on curved wall 142 over which it can easily pass camming arm 123 outwardly.

In operation, to start the motor circuit operating handle lever 127 is swung about the pivot 124 to move contact block 131 into engagement with fixed contact member 132.

Projection 134 is so mounted on the rotating disc 71 with reference to the various driver cams, that all of the several operations of the machine will be performed before the projection 134 arrives in contact with the movable contact block 131. In Figure 6, the projection 134, which is moving in a counterclockwise direction as viewed in this figure, has lifted the block 131 out of engagement with the fixed contact member 132, which has opened the motor circuit. Due to inertia the disc and other parts have continued to move, the projection 134 carrying the contact arm 123 around until the movable contact block 131 engages stop wall 135. The momentum movement of disc 71 causes projection 134 to ride up inclined wall 142 (Figure 17), and in doing so pries the movable contact 131 outwardly away from the disc face and away from the projection 134 in order to allow the projection 134 to escape past the movable contact block 131. In so doing the movable contact block 131 levers the switch arm 123 outwardly, the same having a loose fit on pivot bolt 123; the switch arm 123 fulcruming outwardly on the toe 126 as a center and compressing the coil spring 128, which thereafter reacts to snap the switch arm 123 back to its normal position once the projection 134 has cleared the movable contact block 131 in the progress of the circular movement of the projection 134 around with the disc 71.

The coil spring 128 has a second or double function in that, besides biasing the switch arm 123 to a normal position close against the frame and with the movable contact block 131 close to the disc face in position to be encountered by projection 134, such coil spring 128 exerts considerable load or yieldable pressure through the block 131 on the projection 134 to create a friction brake between these two surfaces during the entire time the projection 134 is passing back of the movable contact block 131. This friction brake acts to arrest the inertia momentum of the movable parts of the machine and to bring the machine abruptly to a stop at this particular position. This stop and brake will prevent overrunning of the parts and the haphazard stoppage of the machine related to the position of the driver members on the disc. In other words the machine must be stopped substantially in the position shown in Figures 2, 4 and 7 where the plunger head is raised sufficiently to allow grapefruit, oranges or other fruits to be introduced into the receiver 20.

Drip cup

Referring more particularly to Figures 2 and 4, a drip cup 137 is shown as pivoted at 138 to the spout 47 so that in a position of stable equilibrium it will assume the condition of Figure 2 with its forward wall underlying the mouth of the spout 47 to catch drippings therefrom and to guide the same backwardly into the cup. To the lower portion of the cup is affixed a pilot member 139 adapted to engage the side wall of a receptacle, such as the drinking glass 62 when it is placed upon the bed 61 of the machine in the position indicated in Figure 4. The wall of the receptacle 62 engaging the pilot 139 swings the drip cup 137 on its pivot 138 to a position where the lip of its forward wall retires back of the mouth of the spout to such an extent as not to interfere with the free flow of the fruit juice from the mouth of the spout 47 directly into the receptacle 62. Moreover the pilot member 139 is so constructed and arranged and related to the receptacle wall engaged thereby when the receptacle is seated upon the location provided therefor that the forward wall which previously tilted backwards now tilts down forward with respect to its free lip thus causing the drippings previously accumulating in the drip cup 137 to be delivered to the receptacle 62.

In this way any messy condition in or about the machine or any sloppiness occasioned by casual or accidental spilling of fruit juice in and around the machine is avoided.

The operation and timing of the entire machine

When the motor circuit is closed through the switch member 123 by the manual operation of the handle 127, the electric motor 75 is started and through the worm 73 drives the disc 71 in a manner which is clockwise as observed from the view point of Figure 4 and anti-clockwise from the view point of Figure 6.

It will be understood that one or more pieces of fruit have been previoously thrown into the fruit receiver 20. The disc 71 having been put in operation it acts to move the wrist pin 80 through an angular distance with reference to disc center 78 as will bring down the press plate 43 upon the fruit. Timed with reference to this movement of the press plate or plunger, the driver cam 70 is so angularly related to the wrist pin 80 that such cam 70 now arrives in contact with the lobe 69, raising the arm 67 and the knife gang 63 to incise the fruit. A small angular or rotary movement of the disc 71 suffices to clear cam 70 from lobe 69 and permit lever 67 and the knife gang 63 to fall back to the lower position. The wrist pin 80 continues to descend drawing down the press plate 43 upon the incised fruit, and driving out the juice through the slotted bottom of the receiver 20 into the basin 46 from which it will flow out through spout 47 to the receiving glass or other receptacle 62.

Meantime any oils which are incidentally expressed from the rind of the fruit are caught in the channel 25 of the receiver and drip through the outlet apertures 26 into the trough 54, from which they find their way through spout 55 at the side of the machine and into a suitable receptacle, for instance into the receptacle 56 as shown in Figure 13.

After the plunger or press plate has reached the lowest limit of its movement, as indicated in Figure 6, the wrist pin 80 starts up and causes the pitman 79 to lift the press plate or plunger head out of the receiver 20 and to the elevated position shown substantially in Figure 4 and Figures 7 and 8. The driver cam arm 109 is connected directly to the wrist pin 80 so that as the wrist pin nears the upper limit of its motion such cam arm 109 engages the follower cam arm 108 and begins to turn the shaft 101 to accomplish the dumping operation of the receiver 20, as shown in Figures 8 and 13.

The cam 119 is so angularly placed on the disc 71 with relation to the other active members that it will engage the shoulder 118 of the rod 114 to shift the fruit receiver back to its accustomed place in the machine before the plunger head is again brought down. The wrist pin 80 and the cam 119 are shown in Figure 4 to be at approximately 180 degrees apart on the circle of the disc 71. The cam 119 has just performed its receiver restoring motion and the wrist pin 80 is beginning to descend on the right hand side of the circle of the disc 71.

As soon as the cam 119 clears the shoulder 118, the projection 134 on the opposite side of the disc rides against the movable contact block 131 and shifts this block out of contact with the fixed contact member 132, opening the motor circuit. This projection 134 and movable contact block 131 go on in a manner previously described, to effect complete stoppage of the machine with all the parts in a definite origin position with a sufficient gap between the plunger head and fruit receiver to receive subsequent pieces of fruit for a sequential expressing operation which is commenced by manually closing the switch by use of the lever 127. The cycle of operation is thereupon repeated.

It is obvious that various changes and modifications may be made in the details of construction and design of the above specifically described embodiment of this invention without departing from the spirit thereof, such changes and modifications being restricted only by the scope of the following claims.

What is claimed is:

1. In a juice extracting machine, a dumping mechanism comprising a fruit receiver, means to initiate tilting movement of said receiver, and potentially inactive means rendered kinetic by the initiating movement to finally and sharply further tilt the receiver to throw the fruit hull therefrom.

2. A dumping mechanism for fruit juice extracting machines comprising a fruit receiver, means to lift and translate said receiver out of its accustomed place in the machine, and means to rotate the displaced receiver in a direction to dump the fruit hull therefrom.

3. In a juice extracting machine having a plunger, a base and a fruit receiver normally and removably seated on the base and below the plunger, a dumping mechanism comprising means to first raise the receiver to clear the base and subsequently to translate the receiver to a place laterally beyond the plunger, and potentially inactive means rendered kinetic by the motion of translation to rotate the displaced receiver in a direction to discharge therefrom the hull of the pressed fruit.

4. In a juicing machine, a base, a movable knife therein, a fruit receiver removably seated on the base and having a slot to receive the knife, a plunger mounted to move down upon the fruit in said receiver, translating means to shift the receiver bodily aside from the path of the plunger, trip means to partially rotate the receiver when translated, throw means released by said trip means to cause final rapid and sudden rotation of the receiver in a direction to discharge the hull of the fruit, and coordinate means to first cause the plunger to descend into holding engagement with the fruit, and subsequently to cause the knife to rise and incise the held fruit, the plunger to further descend to express the juice from the fruit and to rise out of the receiver, and the translating, trip and throw means to eject the fruit hull from the receiver.

5. In a juicing machine as claimed in claim 4, return means actuated by said coordinate means to cause the reverse rotation and movement of the receiver back to normal position on said base.

6. A dumping motion for juicing machines comprising a fruit receiver, a shaft supporting the same for rotary dump motion, a bearing for the shaft, a second shaft intersecting the axis of the first shaft and fixedly carrying said bearing, means to rotate and lift the second shaft to translate the receiver latterly of its accustomed position in the machine, trip means to partially rotate the receiver on the first shaft when translated, an energized spring in a dead center position when the receiver is in accustomed place positioned to be released by the partial rotation of the first shaft and connected to the first shaft to cause rapid rocking of the receiver to throw the fruit hulls therefrom, and means to restore the parts to initial position and the receiver to its accustomed place.

7. In a juicing machine, a fruit receiver, a base on which said receiver is adapted to seat and having a basin and a trough therein, means in the receiver to separately convey off to the trough and basin the rind oils and expressed juice of the fruit, and means to convey the oils and juice from the trough and basin to individual destinations outside the machine.

8. In a juicing machine, a fruit receiver, a false bottom therefor comprising a ring, circumferentially-spaced lugs outstanding from the ring, spring tongues projecting inwardly and upwardly from the ring, a handle for the ring, means to clamp the handle to the receiver, and detent means in the receiver adapted to be engaged by a lug of said ring.

9. In a juicing machine, a fruit receiver, means to move the receiver out from the machine and to dump the same, and means to restore the receiver comprising a shouldered reciprocating member, means to engage said member to shift same in a restoring direction, stop means to limit the movement of the member in either direction, and cooperating means moved by the dump means to shift said member in one direction and in turn shifted by said member to initial position.

10. In a juicing machine, a fruit receiver, a base to removably receive said receiver, a knife to enter the receiver to incise the fruit, a plunger above the receiver to express the juice from the incised fruit, dump means to discharge from the receiver the hull of the squeezed fruit, a stop motion for the machine, and coordinate means for actuating all of the agencies of the machine in a timed relation as follows to move the plunger down into holding relation to the fruit, to actuate the knife to incise the fruit so held, to further move the plunger down to squeeze the fruit, to raise the plunger, to dump and restore the receiver, and to stop the machine with the plunger raised above the receiver.

11. In a juicing machine, a base having separate rind oil and juice repositories and outlets, a fruit receiver removably mounted on the base and having a slotted bottom for the juice and a channel for the oil, means to center the receiver on the base, a plunger above the receiver, means to move the plunger into contact with the fruit placed in the receiver, means in the base for thereupon rising through the slotted bottom to incise the held fruit, said plunger operating means continuing to draw the plunger down on its squeezing stroke and to thereupon raise it out of the receiver, means to then dump and restore the receiver, means to then shut off the power from the machine and brake it to a stop.

FREDERICK L. McCULLOCH.